United States Patent [19]

Majerus et al.

[11] Patent Number: 4,826,416
[45] Date of Patent: May 2, 1989

[54] SYSTEM FOR INJECTION MOLDING TIRE TREADS

[75] Inventors: Norbert Majerus; John S. Rambacher, both of Akron, Ohio

[73] Assignee: The Goodyear Tire & Rubber Company, Akron, Ohio

[21] Appl. No.: 202,130

[22] Filed: Jun. 2, 1988

[51] Int. Cl.[4] .................................... B29C 45/14
[52] U.S. Cl. ........................... 425/115; 156/125; 264/167; 264/308; 264/328.2; 264/328.8; 425/543; 425/547; 425/572; 425/574; 425/581
[58] Field of Search .............. 425/115, 543, 547, 572, 425/574, 581; 264/308, 328.2, 328.8, 328.3, 167; 156/125, 137, 140

[56] References Cited

U.S. PATENT DOCUMENTS

| | | | |
|---|---|---|---|
| 2,710,425 | 5/1951 | Rhodes | 425/34.1 |
| 2,897,540 | 8/1959 | Rhodes | 425/582 |
| 3,992,503 | 11/1976 | Henfrey et al. | 264/167 |
| 4,185,065 | 1/1980 | Knipp et al. | 264/254 |
| 4,230,649 | 10/1980 | Bohm et al. | 264/22 |
| 4,588,365 | 5/1986 | Holzschuh | 264/328.8 |

FOREIGN PATENT DOCUMENTS 0176945  4/1986  European Pat. Off. .

Primary Examiner—Jay H. Woo
Assistant Examiner—Timothy W. Heitbrink
Attorney, Agent, or Firm—Frederick K. Lacher; T. P. Lewandowski

[57] ABSTRACT

A ring tread (12) or a continuous tread (16) may be injection molded in a generally cylindrical segmental mold (20) having a core (42) and radially movable segments (46) forming a mold cavity (54). A container ring (60) is movable into engagement with the segments (46) during closing of the segmental mold (20) to retain the segments (46) during closing of the segmental mold (20) to retain the segments (46) in position during injection and curing. The container ring (60) may have an opening for a continuous tread section to extend from the mold cavity (54) through the side of the container ring (60) and through a space between two of the segments (46). Roller supports on the core (42) support the continuous tread (16) when the segmental mold (20) is opened and sections of the continuous tread (16) are shifted circumferentially through the mold cavity (54).

19 Claims, 11 Drawing Sheets

SYSTEM FOR INJECTION MOLDING TIRE TREADS

RELATED PATENT APPLICATIONS

U.S. Pat. application Ser. No. 201,769, entitled "System for Injection Molding Elongated Bodies", filed June 2, 1988, which is assigned to the assignee of this patent application, is also directed to the injection molding of continuous tire treads and is being filed at the same time this application is being filed.

BACKGROUND OF THE INVENTION

This invention relates to injection molding tire treads, especially ring treads and continuous treads which are molded in a generally cylindrical segmental mold having a core and radially movable segments forming a mold cavity. A container ring is movable into engagement with the segments during closing of the mold to retain the segments in position during injection and curing. By modifying the apparatus of this invention, it may be used to injection mold ring treads of continuous treads extending from the mold cavity through the side of the container ring from a space between two of the segments. The continuous tread may be cut to a desired length at the time of use for adherence to a new tire casing or to a tire to be retreaded by a suitable adhesive.

Heretofore, it has been proposed to make ring treads by injection molding the tread in a mold cavity between a core and continuous mold halves. It has also been proposed to make a continuous tread by feeding a strip of unvulcanized rubber onto a rotating cylinder and then enclosing the strip with mold segments rotating with the cylinder and radially movable into engagement with the cylinder. The tread is cured by container molding and is then removed from the cylinder as the mold segments are moved radially away from the cylinder. Continuous tire treads have also been made by passing an extruded rubber strip between cooperating mold segments carried by respective endless belts which apply suitable temperatures and pressures to the strip to produce the surface designs. The molded uncured rubber strip is then removed from the molds and cured by applying radiation or heat.

SUMMARY OF THE INVENTION

The present invention provides an apparatus which is adaptable for injection molding either a ring tread or a continuous tread. A generally cylindrical segmental mold is provided having a core and radially movable segments forming a mold cavity. A container ring is movable into engagement with the segments during closing of the mold to retain the segments in position during injection and curing. With the segmental mold of this invention for making ring treads, the segments are positioned in abutting relationship around the core with runners and gates extending from cold runner blocks to the mold cavities for injection and curing of the tread. Upon opening of the mold, ejecting means are provided for pushing the molded ring treads off the core and onto an unloader positioned between the segmental mold and the container ring.

In accordance with this invention the same mold may be converted into a mold for injection molding a continuous tread by substituting a segment of less width for one of the segments. A space is provided at the end of the mold cavity in communication with an opening in the container ring so that a continuous tread section may extend from the mold cavity through the side of the container ring to a takeoff apparatus. The trailing end of the tread section is clamped by one of the segments to close that end of the mold cavity. A temperature moderating closed end of the mold cavity prevents complete curing of a trailing portion of the injected tread section so that after the section is cured, the mold may be opened and the section shifted to the open end of the mold cavity where it may be adhered to the leading end of the next section to be molded.

In accordance with an aspect of the invention there is provided an apparatus for injection molding of a continuous elongated body of curable fluid molding material by increments comprising a generally cylindrical segmental mold having a core and radially expandable and contractible mold segments at circumferentially spaced positions around the core forming a mold cavity in the mold, a closed end of the mold cavity at the end of a first one of the segments, an open end of the mold cavity adjacent a second one of the segments spaced from the closed end a distance less than the length of the elongated body, means for injecting a curable fluid molding material into the mold cavity to form a first section of the elongated body in a first position with a trailing portion abutting the closed end, means for heating the injected fluid molding material to cure the first section, temperature moderating means for limiting the heating of the trailing portion of the first section at the closed end of the first one of the segments to prevent full curing of the trailing portion of the first section, means for expanding the segments of the mold to permit shifting of the first section circumferentially from the first position in the mold cavity to a second position with the trailing portion of the first section at the open end of the mold cavity and the remainder of the first section being outside of the mold, means to support the cured elongated body as it is shifted circumferentially in the mold cavity after expansion of the segments, the means for closing the mold being operative to move the segments radially inward to enclose the mold cavity and urge the second one of the segments radially inward to clamp the trailing portion of the first section, the means for injecting the curable fluid molding material being operative to form a second section of the elongated body with a leading portion of the second section abutting the trailing portion of the first section, and a trailing portion of the second section abutting the closed end of the mold cavity at the end of the first one of the segments, the means for heating being operative to heat the injected fluid molding material of the second section and the trailing portion of the first section to cure the second section and adhere the trailing portion of the first section to the leading portion of the second section, and the opening means being operative to expand the segments radially outward to open the mold and permit movement of the trailing portion of the first section and the second section of the elongated body circumferentially through the mold cavity.

In accordance with another aspect of the invention there is provided an apparatus for injection molding of a tread of curable fluid molding material comprising a generally cylindrical segmental mold having a core and radially movable segments supported on an upper press member forming a mold cavity between the segments and the core, a container ring supported on a cold runner block underneath the container ring and engageable with the radially outer surfaces of the segments, the cold runner block being supported on a lower press member, means for injecting a curable fluid molding material into the mold cavity, means for heating the injected fluid molding material to cure the fluid molding material in the mold cavity, means for disengaging the container ring from the segments upon opening the mold and means for expanding the segments of the mold to permit removal of the ring tread from the core.

In accordance with a further aspect of the invention there is provided a method of injection molding a body of curable fluid molding material in a generally cylindrical segmental mold having a core and radially movable outer segments extending around the core to form a generally cylindrical mold cavity comprising:
- (a) closing the mold and confining the segments within a container ring;
- (b) injecting a curable fluid molding material into the mold cavity;
- (c) heating the fluid molding material to at least partially cure the molding material;
- (d) opening the mold and releasing the segments from the container ring;
- (e) expanding the segments; and
- (f) removing the body of curable fluid molding material from the mold.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

BRIEF DESCRIPTION OF THE DRAWINGS

Referring to FIG. 1, a tire press 10 for injecting ring treads 12 is positioned adjacent a tire press 14 for injection molding continuous treads 16. An injection molding machine 18 is positioned between the tire press 10 and tire press 14 for injecting a curable fluid molding material such as rubber into segmental molds 20 positioned in the tire presses as shown in FIGS. 2, 3, 4 and 5.

Figure 1:
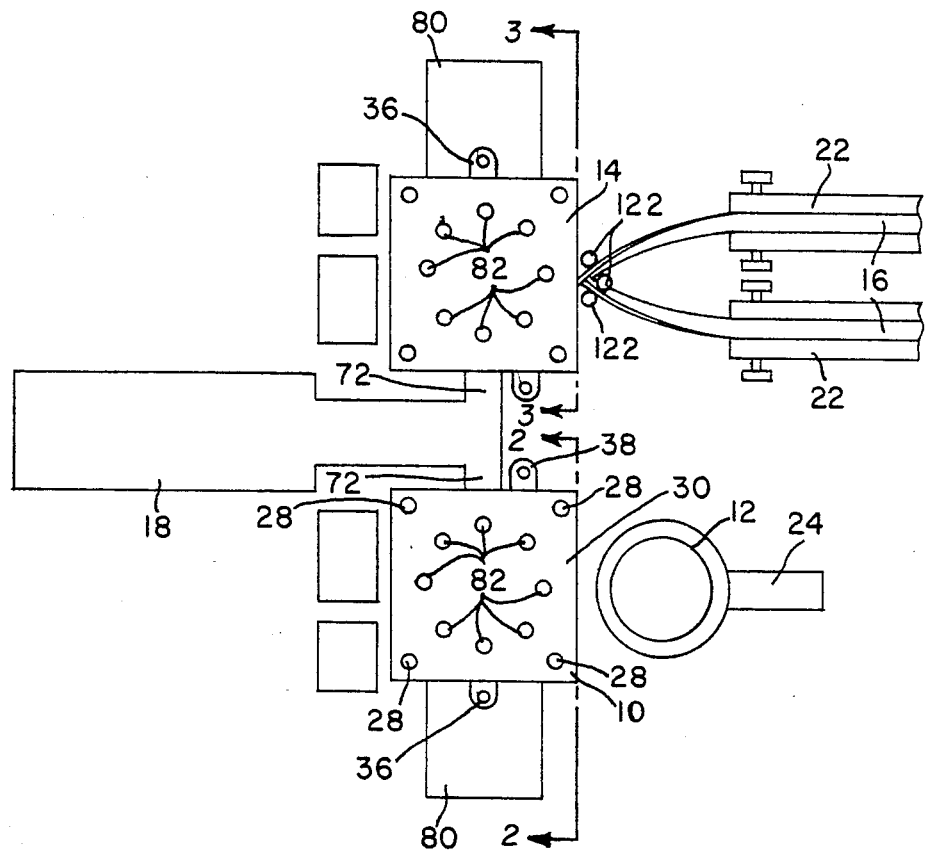
FIG. 1 is a schematic plan view of an injection molding system showing one press for making ring treads and a second press for making continuous treads.

Conveyors 22, shown in FIG. 1, may be provided for carrying the continuous treads 16 to a suitable location for storage. Unloaders 24, shown in FIGS. 1 and 4, may be inserted under the segmental molds 20 for receiving the ring treads 12 and then transporting them to suitable conveyors or storage equipment.

Figure 2:
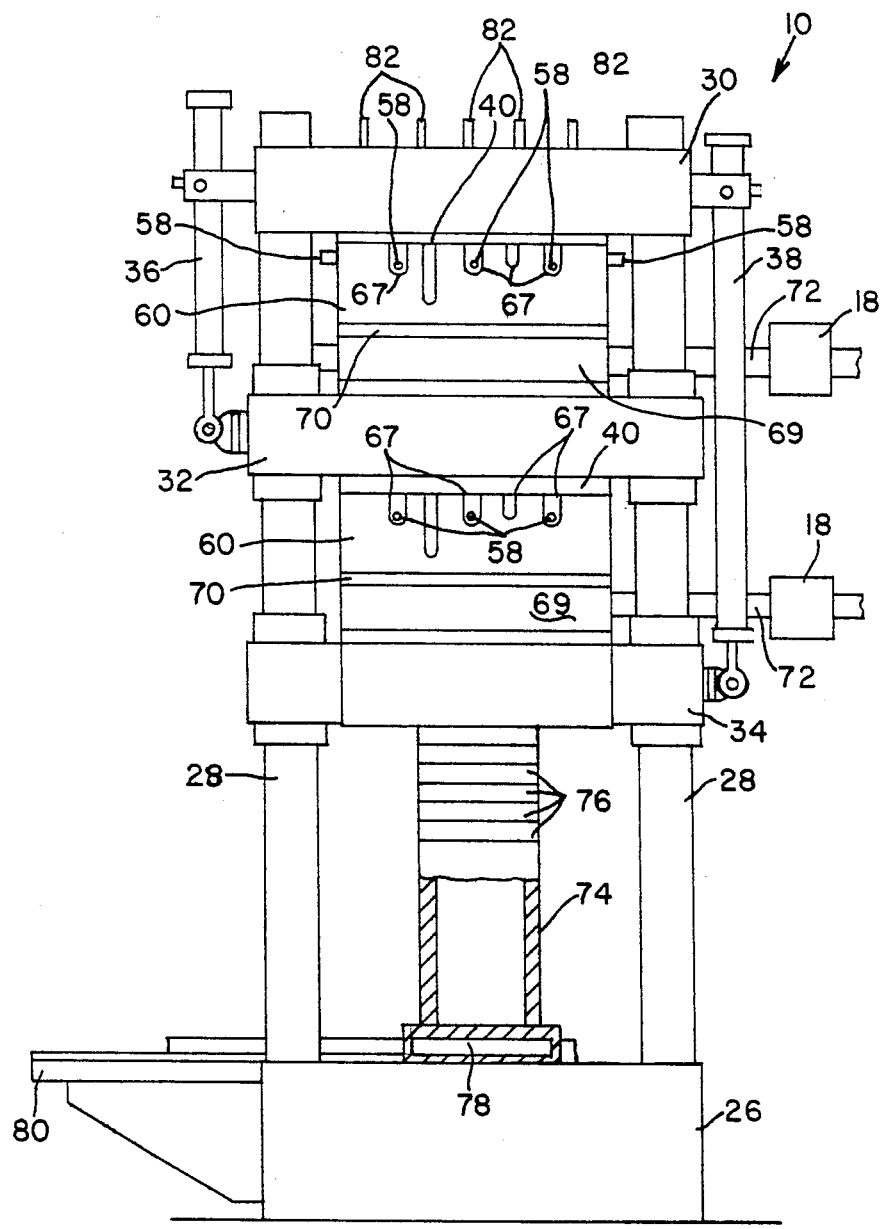
FIG. 2 is a front elevation of the injection molding press for making ring treads shown in the closed position and taken along line 2—2 in FIG. 1 with the mold squeeze pressure transfer column broken away and with the segmental mold actuating cylinders not shown.
Figure 4:
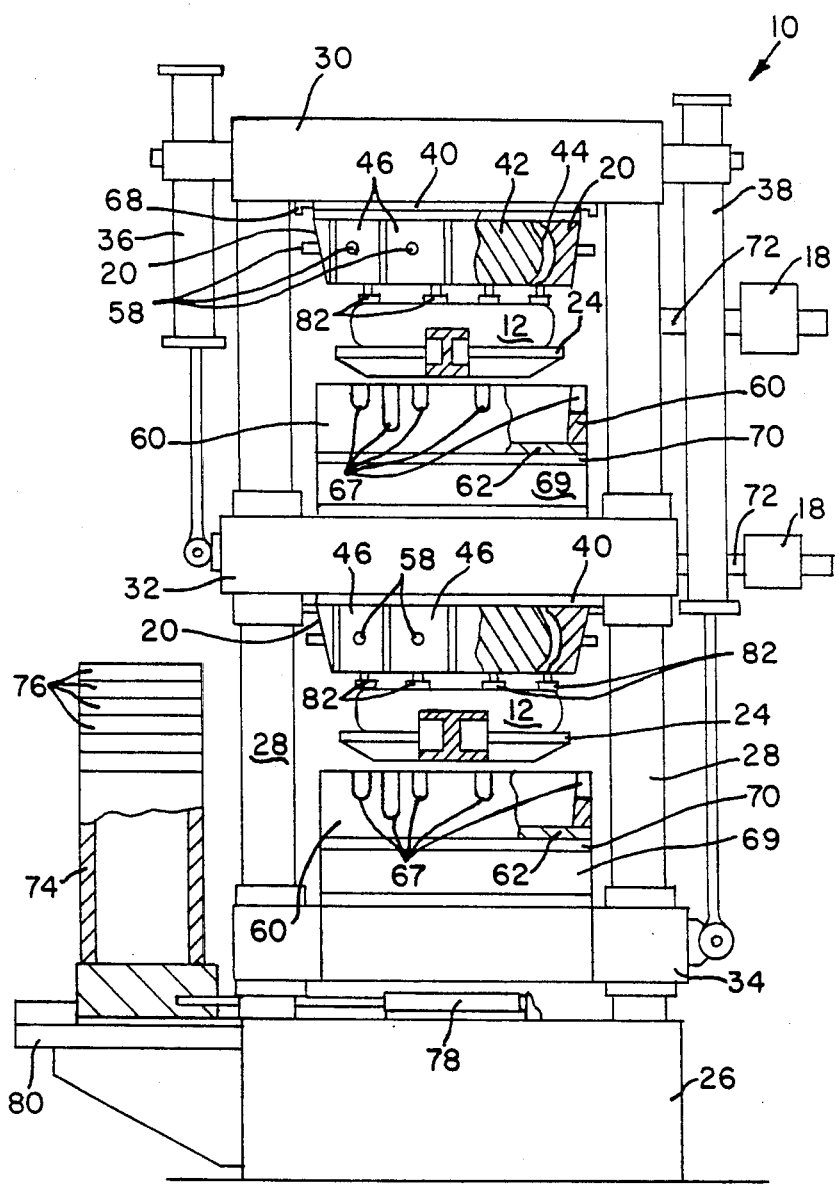
FIG. 4 is a front elevation of the injection molding press of FIG. 2 shown in the open position with the treads ejected onto the unloader platforms and with parts being broken away.
Figure 10:
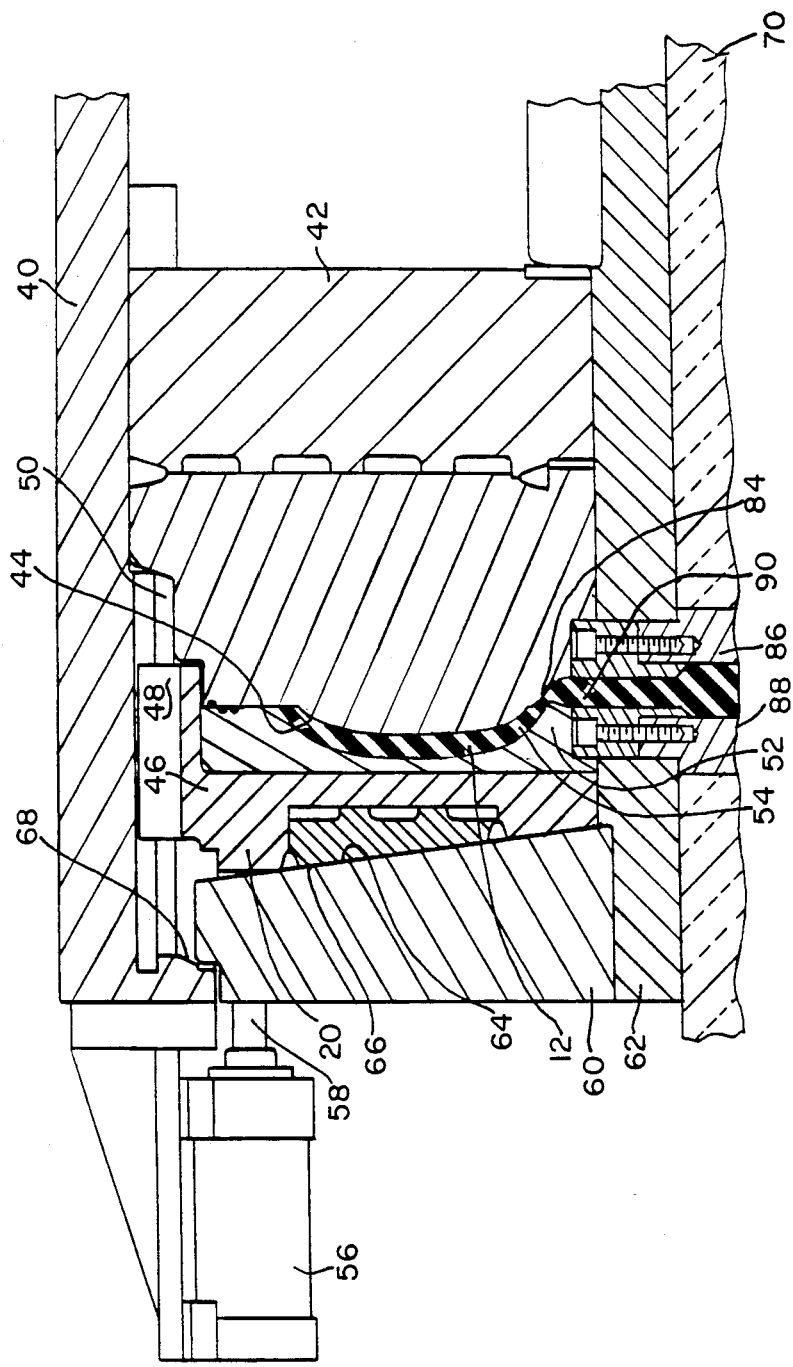
FIG. 10 is a view like FIG. 6 of one of the closed molds shown in FIG. 2 after the ring tread is injected into the mold.

Referring to FIGS. 2, 4 and 10, the apparatus for injection molding the ring treads 12 in a tire press 10 will be described. The tire press 10 has a base 26 supporting four tie rods 28 clamped to a bolster 30. A top moving plate 32 and a bottom moving plate 34 are slidably mounted on the tie rods 28 and connected to the bolster 30 by hydraulic piston and cylinder assemblies 36 and 38, respectively.

Each of the segmental molds 20 has a top end plate 40 fastened to the bolster 30 or top moving plate 32. A core 42 is mounted on the top end plate and has a generally cylindrical core surface 44 which is barrel-shaped to conform with the shape of the tire for which it is made. Mold segments 46 have T-bars 48 slidably mounted in T-slots 50 for radial movement of the segments. In the embodiment shown, eight mold segments 46 provide a continuous segmental outer tread insert 52 having a curved tread surface which defines a mold cavity 54 with the core surface 44 in which the ring tread 12 is molded.

Segmental mold actuating cylinders 56, shown in FIG. 10, are mounted on brackets connected to the top end plate 40 and connected to the mold segments 46 by piston rods 58. The mold actuating cylinders 56 may be in communication with a source of fluid pressure and suitable controls for radially contracting and expanding the mold segments 46 as desired. A container ring 60 is mounted on a bottom hot plate 62 and has a tapered inner surface 64 for engagement with tapered surfaces 66 of the mold segments 46. The upper edge of the container ring 60 has slots 67 for the piston rods 58 and extends within a tapered register 68 of the top end plate 40 providing a register for seating the container ring and holding it in position during the molding process. The bottom hot plate 62 is supported on a cold runner block 69 insulated from the bottom hot plate 62 by suitable insulation 70. The cold runner block 69 of each of the segmental molds 20 is supported on the top moving plate 32 and bottom moving plate 34 so that when the mold is closed, as shown in FIG. 2, a connection may be made with the injection molding machine 18 through conduits 72.

With the tire press 10 of this embodiment, the segmental molds 20 are closed by retracting the pistons of the hydraulic piston and cylinder assemblies 36 and 38 to the position shown in FIG. 2. A mold squeeze pressure transfer column 74 is positioned between the base 26 and bottom moving plate 34 so that pressure may be applied to the segmental molds between the bottom moving plate, top moving plate 32 and bolster 30 by a ram (not shown) in the base 26. Spacers 76 may be placed on top of the transfer column 74 to adjust the press 16 to the height of the mold 20. The clamping pressure is preferably from 600 to 1,000 tons (609.62 to 1016 metric tons). Heating of the segmental molds 20 may be provided by heating passages in communication with a suitable heating means such as steam. The molds 20 are heated to a relatively high temperature in the range of from 300° F. to 400° F. (149° C. to 204° C.) and preferably to around 340° F. (171° C.). The curing time of the ring treads 12 may be from one and one-half to eight minutes depending upon the curing properties of the injected rubber, the temperature of the segmental molds 20 and the thickness of the ring treads 12 which may be in a range of from 12/32 to one inch (0.95 to 2.54 cm).

After injection molding the ring tread 12, the ram pressure exerted on the transfer column 74 is released and the transfer column is moved by a suitable means such as a rack and pinion mechanism 78 to an outboard position on a base extension 80. The segmental molds 20 may then be opened to the position shown in FIG. 4 by extending the pistons of the hydraulic piston and cylinder assemblies 36 and 38. The container ring 60 for each of the segmental molds 20 is lowered and the segmental mold actuating cylinders 56 actuated to retract the mold segments 46 away from the core 42 and cured ring treads 12. The unloaders 24 for each of the molds 20 may then be moved into position under the core 42. Suitable ejection means such as ejecting pins 82 slidably mounted in the bolster 30 and top moving plate 32 at circumferentially spaced positions around the core surface 44 may be actuated by suitable means such as hydraulic cylinders (not shown) for pushing the ring tread 12 off the core 42 onto the unloaders 24. The unloaders 24 may then be pulled out of the press to the position shown in FIG. 1 where the ring treads 12 can be transferred to other conveyors or to a storage position.

Each cold runner block 69 of the segmental molds 20 has runners in communication with a plurality of circumferentially spaced gates 84 along at least one side of the mold cavity 54. Cooled nozzles 86, attached to the cold runner block 69 are connected to the gates 84 by tapered sprues 90. Accordingly, the fluid molding material remaining in the cooled nozzles 86 and in the runners of the cold runner block 69 is prevented from curing and the cured fluid molding material in the gates 84 is removable after curing of the ring treads 12.

To prepare the segmental molds 20 for injection molding of additional ring treads 12, the segmental mold actuating cylinders 56 are actuated to extend the piston rods 58 causing the segments 46 to contract to a position in proximity to the core surface 44. The hydraulic piston and cylinder assemblies 36 and 38 are actuated to raise the container ring 60 so that the tapered inner surface 64 of the ring engages the tapered surfaces 66 of the segments 46. The rack and pinion mechanism 78 is then actuated to move the mold squeeze pressure transfer column 74 into position over the base 26. The segmental molds 20 are then heated and held in place by the container ring 60. Pressure is applied to the mold squeeze pressure transfer column 74 by the ram in the base 26. At the same time, the curable fluid molding material is injected from the injection molding machine 18 through the conduits 72 to the runners in the cold runner block 69 and then through the cooled nozzles 86 and into the tapered sprues 90 and gates 84 for filling the mold cavity 54. Suitable vents in communication with a source of vacuum may be provided in the walls of the mold cavity 54 to facilitate filling of the mold cavity and elimination of air pockets. A bumping cycle may also be used, as required.

Referring to FIGS. 1, 3, 5, 6, 7, 8 and 11, the tire press 14 for injection molding continuous treads 16 is like the tire press 10 for ring treads 12 except for certain modifications. The parts of this press 14 which are identical with the parts of the tire press 10 described hereinabove will be identified with the same numerals. In addition, the core surface 44 and the tread insert 52 will be identified with the same numerals even though the mold cavity surfaces are flat and not curved as they are in the molds 20 for the ring treads 12.

Figure 8:
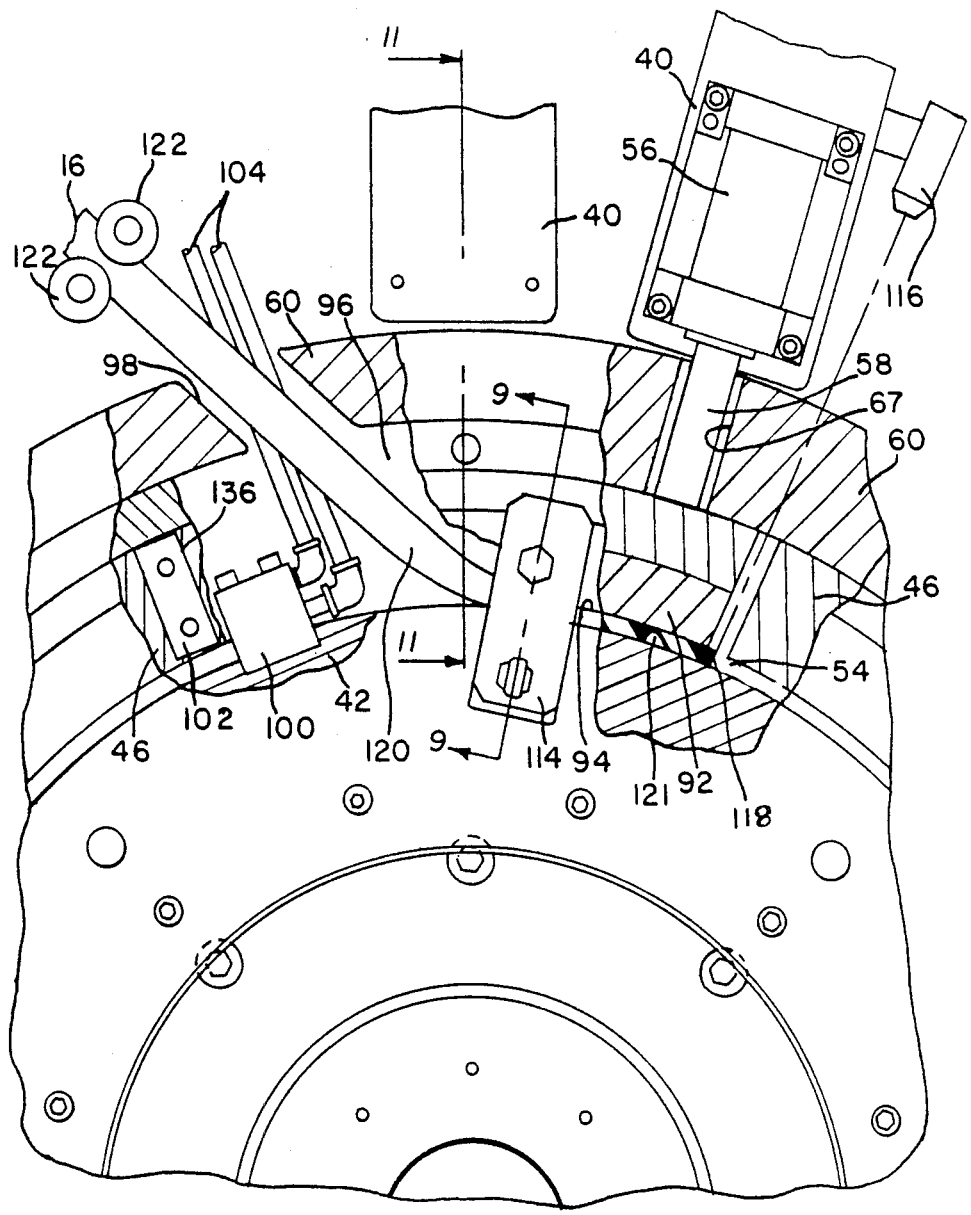
FIG. 8 is a fragmentary bottom view, with parts broken away, taken along lines 8—8 of one of the molds shown in FIG. 6 showing the continuous tread clamped in the mold and extending through the wall of the container ring to the take-off apparatus.
Figure 9:
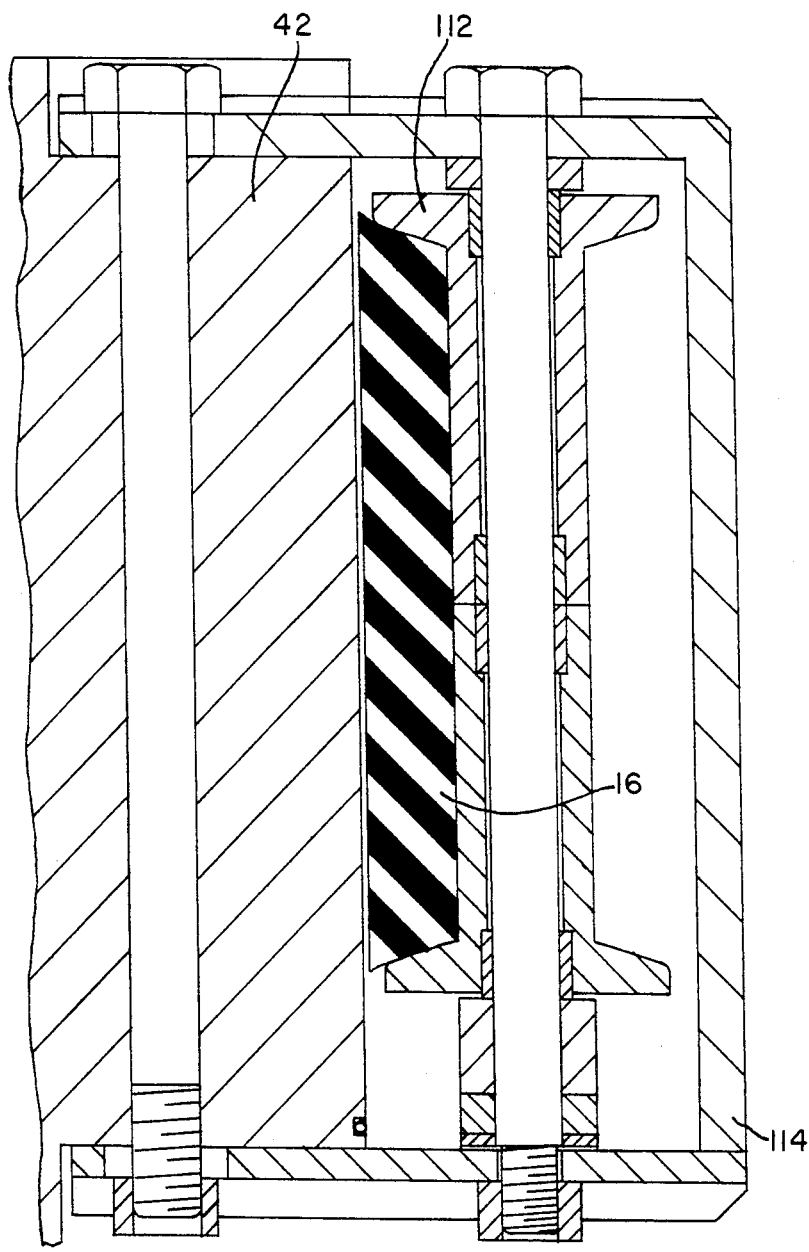
FIG. 9 is an enlarged fragmentary detail view of the roller guide taken along line 9—9 in FIG. 8.

The first modification in tire press 14 for injection molding continuous treads 16 is the removal of one of the first-mentioned mold segments 46 and the substitution of a second mold segment 92 having a reduced circumferential length in the space provided. As shown in FIG. 8, the second mold segment 92 is actuated by a segmental mold actuating cylinder 56 connected to the segment by one of the piston rods 58 extending through one of the slots 67 in the container ring 60. In the embodiment shown, the tire press 14 has a tread cavity 54 which is divided into equal angular spaces enclosed by the first-mentioned mold segments 46 plus a shortened angular space enclosed by the second mold segment 92. The second mold segment 92 is positioned adjacent one of the first-mentioned mold segments 46 for enclosing an open end 94 of the mold cavity 54. The second mold segment 92 is spaced circumferentially from another one of the first-mentioned segments 46 to provide a letoff space 96 through which the continuous tread 16 may pass. This letoff space 96 extends to the container ring 60 where a tread slot 98 is provided through which the tread 16 may pass.

At the edge of the first-mentioned mold segment 46 adjacent the letoff space 96, a temperature moderating plate 100 is mounted on the core 42 providing a closed end 102 for the mold cavity 54 of the tire press 14. The temperature moderating plate 100 may be a cooling plate having passages connected to cooling pipes 104 in communication with a source of cooling fluid such as water.

Figure 7:
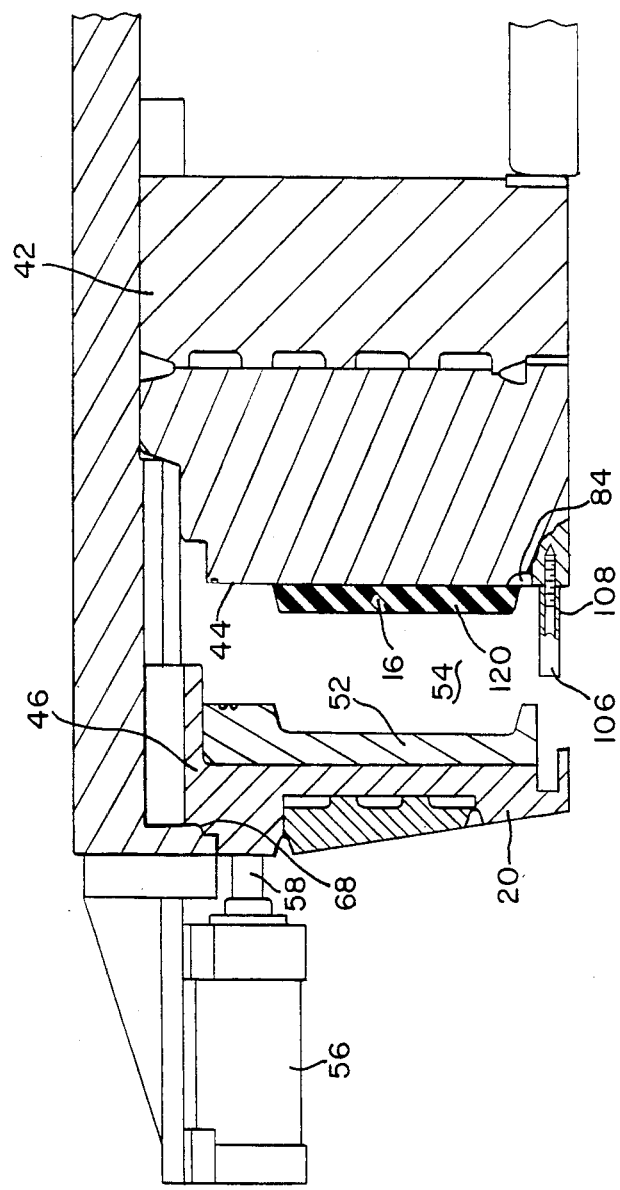
FIG. 7 is an enlarged fragmentary sectional view like FIG. 6 of one of the open molds shown in FIG. 5.

Another modification in the tire press 14 is the provision of rollers 106 mounted on the lower edge of the core surface 44 at circumferentially spaced positions around the core 42 for supporting the continuous tread 16 when the mold segments 46 have been expanded as shown in FIG. 7. The rollers 106 may have rotatable sleeves 108 to facilitate the sliding action of the continuous tread 16 over the rollers. Grooves may also be provided in the bottom edges of the mold segments 46 and tread inserts 52 for receiving the support rollers 106 upon closing of the segmental mold 20.

A tread guide roller 112 is mounted in a bracket 114 fastened to the core 42 at the open end 94 of the tread cavity 54 for guiding the continuous tread 16 and holding it in position for clamping by the second mold segment 92. The bracket 114 is adjustable for moving the guide roller 112 toward and away from the core 42 depending upon the thickness of the continuous tread 16.

As shown in FIG. 8, a laser 116 may be mounted on the top end plate 40 and be in alignment with the space between the second mold segment 92 and the adjacent first-mentioned mold segment 46 to determine when a trailing edge 118 of a first section 120 of the continuous tread 16 passes from the tread cavity angular space adjacent the last of the first-mentioned mold segments 46 and under the second mold segment 92. The laser 116 may be connected to suitable controls for stopping the movement of the first section 120 of the continuous tread 16 and causing the segmental mold actuating cylinder 56 for the second mold segment 92 to be actuated and clamp a trailing end 121 of the first section and thereby seal the open end 94 of the mold cavity 54.

Suitable tread pulloff apparatus such as pulloff rollers 122 may be positioned outside the press 14 for engaging the continuous tread 16 and pulling it out of the press and onto the conveyor 22. The pulloff rollers 122 may be rotated by motors which are connected to the control means for actuation at appropriate times.

Figure 11:
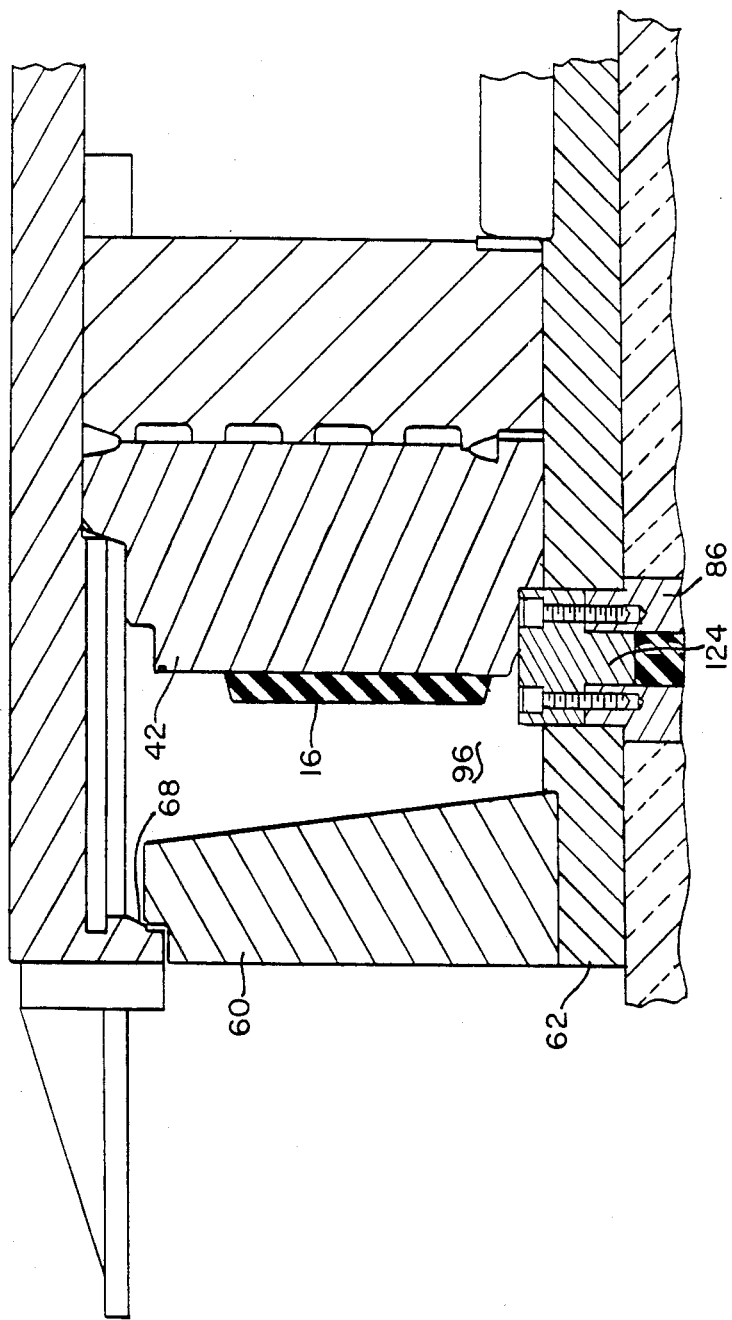
FIG. 11 is a fragmentary sectional view taken along line 11—11 in FIG. 8 showing a nozzle plug in one of the nozzles in the letoff space.

As shown in FIG. 11, the nozzles 86 in the bottom hot plate 62 at the edges of the letoff space 96 may be cut off by inserting plugs 124 in the nozzles and fastening them in the hot plate by screws 126.

Figure 3:
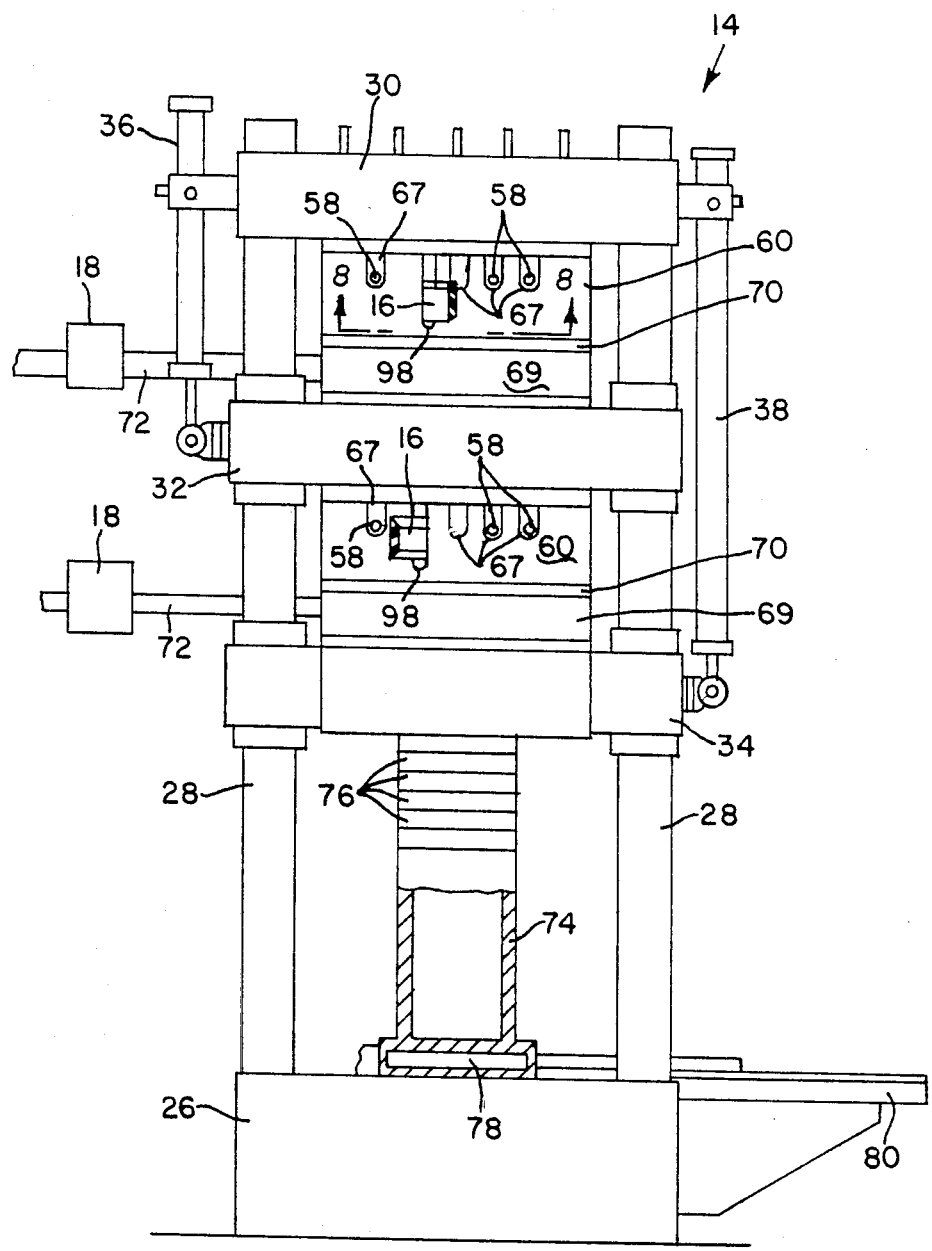
FIG. 3 is a front elevation like FIG. 2 of the injection molding press for making continuous treads shown in the closed position taken along line 3—3 in FIG. 1 with the mold squeeze pressure transfer column broken away and with the segmental mold actuating cylinders not shown.

In operation, the tire press 14 of this embodiment closes the segmental molds 20 by retracting the pistons of the hydraulic piston and cylinder assemblies 36 and 38 to the position shown in FIG. 3. The mold squeeze pressure transfer column 74 is positioned between the base 26 and bottom moving plate 34 so that pressure may be applied to the segmental molds 20 between the bottom moving plate, top moving plate 32 and bolster 30 by a ram (not shown) in the base. Spacers 76 may be placed on top of the transfer column 74 to adjust the press 14 to the height of the molds 20. The pressure applied, the heating of the segmental molds 20 and the injection of a curable fluid molding material such as rubber as well as the curing time of the continuous tread sections 120 may be the same as for injection molding of the ring treads 12 in tire press 10.

Vacuum passages (not shown) may be provided in the segmental molds 20 in communication with the mold cavities 54. Also a bumping cycle may be used, if required. The cold runner block 69 may have cooling passages for a suitable cooling medium such as water which may be in a range of 160° F. to 260° F. (71° C. to 127° C.), and preferably around 220° F. (104° C.) at 80 psi (5.62 kg/cm$^2$). The temperature of the cold runner block 69 is maintained between 200° F. and 280° F. (93° C. to 138° C.) for optimum results. Heating of the segmental molds 20 may be provided by heating passages in communication with a suitable heating means such as steam. The injected rubber is heated to a relatively high temperature in the range of from 300° F. to 400° F. (149° C. to 204° C.) and preferably to around 340° F. (171° C.). The curing time of the tread sections 120 may be from one and one-half to eight minutes depending upon the curing properties of the injected rubber, the temperature of the segmental molds 20 and the thickness of the tread sections which may be in a range from 12/32 to one inch (0.95 to 2.54 cm). As shown in FIG. 8, no barrier member is for molding the first section 120 of tread 16. Some of the rubber of the first section 120 is injected through the open end 94 forming a partially foamed plug which is cut off later. Thereafter the trailing end 121 of the first section 120 will close the open end 94. During injection of the rubber, the trailing edge 118 engages the temperature moderating plate 100 which is cooled to prevent full curing of the trailing edge. The partially cured trailing edge 118 is preferably relatively thin and has a thickness of from 0.40 to 0.20 inches (1.016 to 5.08 mm). After the first section 120 is cured in the segmental molds 20 for a predetermined time, the ram pressure exerted on the transfer column 74 is released and the transfer column is moved by a suitable means such as the rack and pinion mechanism 78 to an outboard position on the base extension 80. The molds 20 may then be opened to the position shown in FIG. 5 by extending the piston of the hydraulic piston and cylinder assemblies 36 and 38. The container ring 60 for each of the segmental molds 20 is lowered and the segmental mold actuating cylinders 56 actuated to expand the mold segments 46 away from the core surface 44 and the cured first section 120. Preferably the mold segments 46 are expanded from the tread 16 in sequence starting with the first-mentioned mold segment 46 adjacent the temperature moderating plate 100. If desired a spring-loaded tread release insert 136 may be mounted in the mold segment 46 to assist in separating the tread section 120 from the core sur-face 44 as the segments are expanded.

Figure 5:
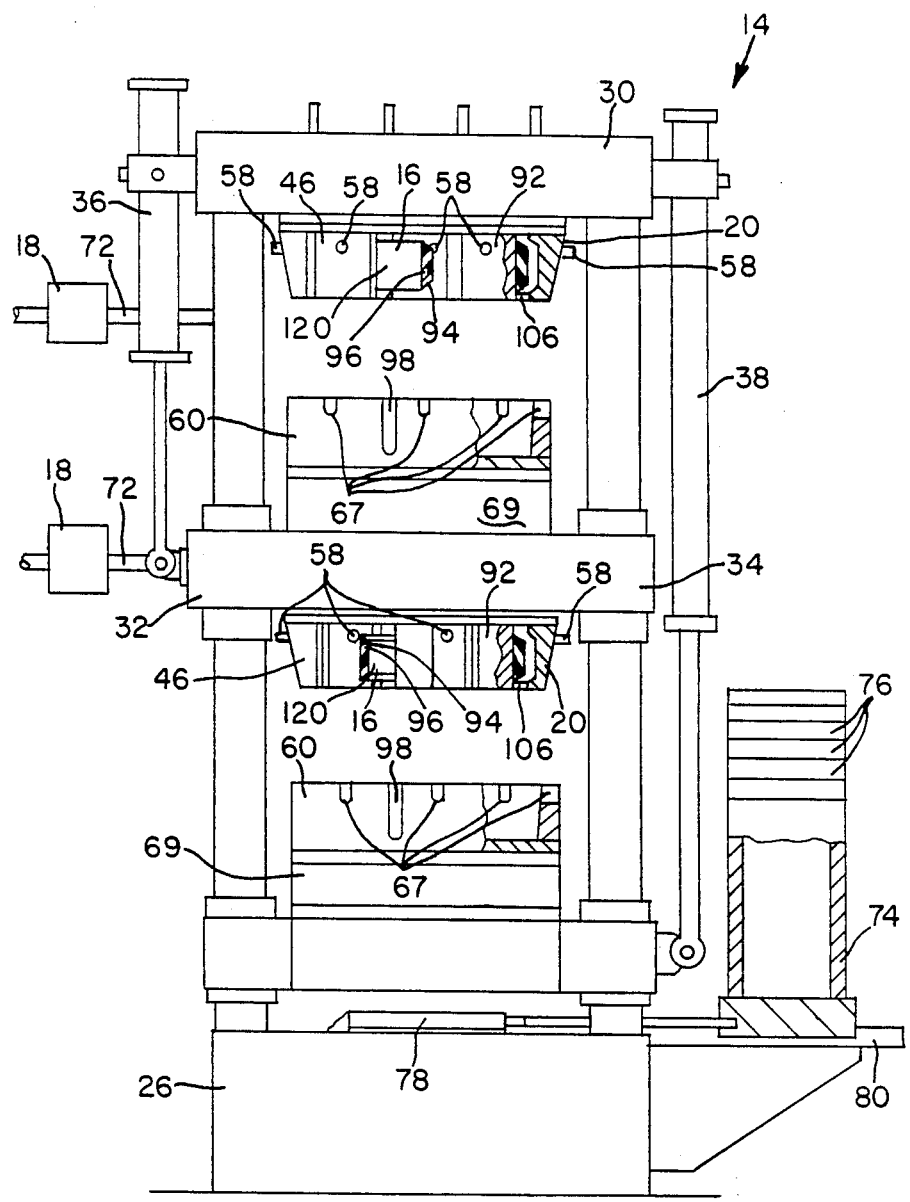
FIG. 5 is a front elevation of the injection molding press of FIG. 3 shown in the open position with parts being broken away.
Figure 6:
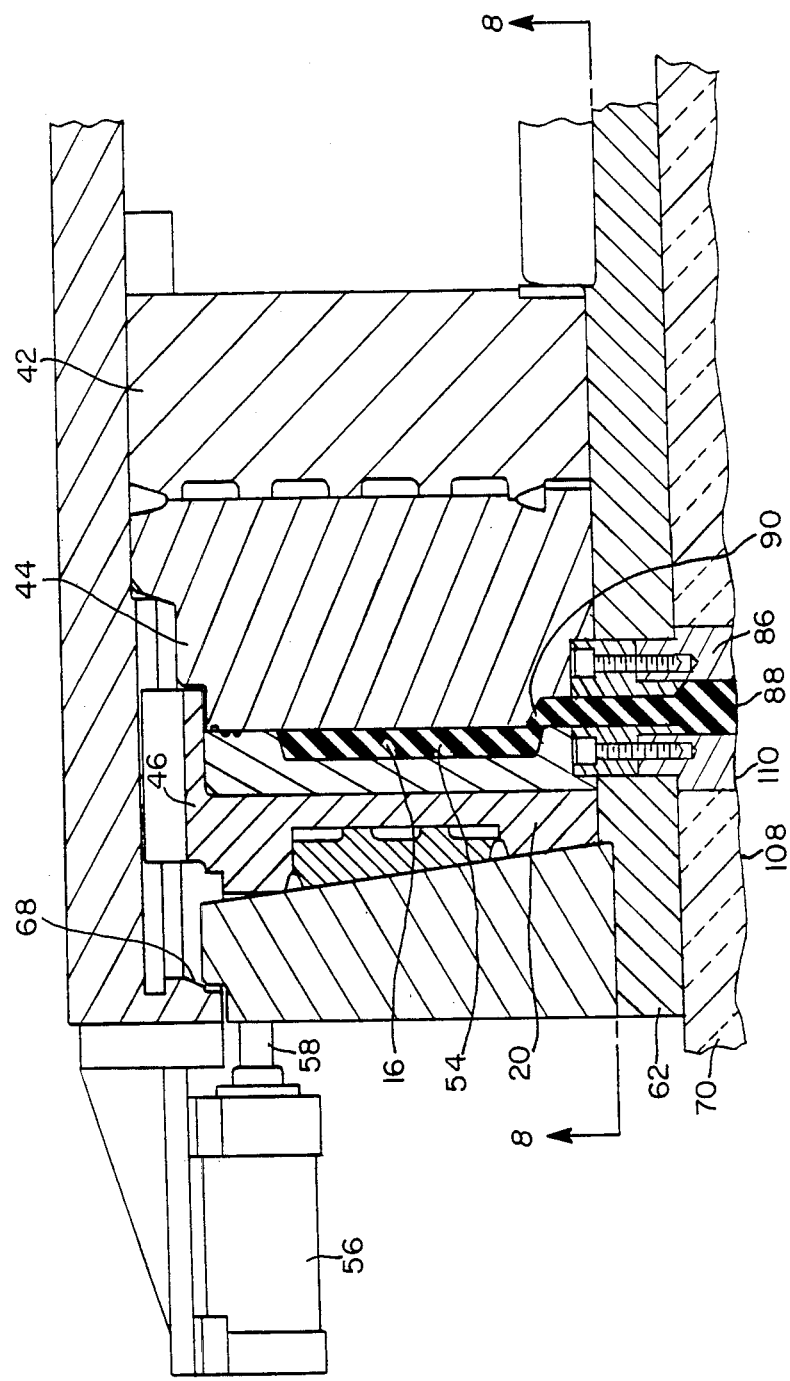
FIG. 6 is an enlarged fragmentary sectional view of one of the closed molds shown in FIG. 3 after the tread is injected into the mold taken along a radial plane extending through the axis of the mold.

As shown in FIGS. 5 and 7, the first section 120 of continuous tread 16 is then supported on rollers 106 so that the tread does not fall onto the container ring 60 and bottom hot plate 62. The first section 120 is then pulled over the guide roller 112 and through the letoff space 96 and slot 98 to a position in engagement with the pulloff rollers 122. These rollers 122 are then actuated to pull the rest of the first section 120 until the trailing edge 118 passes by the laser 116 at which time the pulloff rollers are stopped and the segmental mold actuating cylinders 56 are actuated to move the first-mentioned segments 46 and second segment 92 into engagement with the core surface 44. This will also clamp the trailing end 121 between the second mold segment 92 and the core surface 44. The segmental molds 20 may then be closed by actuating the hydraulic piston and cylinder assemblies 36 and 38 to retract the pistons to the position shown in FIG. 3. The mold squeeze pressure transfer column 74 is then moved into position between the base 26 and bottom moving plate 34. Pressure is again applied by the ram in the base 26 and a second section (not shown) of the continuous tread 16 is injection molded into the tread cavity 54. During curing of the second section, the leading edge of the second section is adhered to the partially cured trailing edge 118 of the first section 120. After the second section of the tread 16 is cured, the tire press 14 is opened to the position shown in FIG. 5 and the procedure is repeated to cure a desired number of sections providing the continuous tread 16.

While representative embodiments and details have been shown for the purpose of illustrating the invention, it will be apparent to those skilled in the art that various changes and modifications may be made therein without departing from the spirit or scope of the invention.

What is claimed is:

1. Apparatus for injection molding a continuous elongated body made of curable fluid, molding material by increments said apparatus comprising a generally cylindrical segmental mold having a core and radially expandable and contractible mold segments at circumferentially spaced positions around said core forming a mold cavity in said mold, a closed end of said mold cavity at trailing end of a first one of said segment, an open end of said mold cavity adjacent a leading end of said first one of said segments spaced from said closed end a distance less than the length of said elongated body, means for injecting a curable fluid molding material into said mold cavity to form a first section of said elongated body in a first position with a trailing portion abutting said closed end, means for heating said injected fluid molding material to cure said first section, temperature moderating means for limiting the heating of said trailing portion of said first section at said closed end of said first one of said segments to prevent full curing of said trailing portion of said first section, means for expanding said segments of said mold to permit shifting of said first section circumferentially from said first position in said mold cavity to a second position with said trailing portion of said first section at said open end of said mold cavity and the remainder of said first section being outside of said mold, means to support said cured elongated body as it is shifted circumferentially in said mold cavity after expansion of said segments, means for closing said mold to move said mold segments radially inward to enclose said mold cavity and urge said second one of said segments radially inward to clamp said trailing portion of said first section, said means for injecting said curable fluid molding material being operative to form a second section of said elongated body with a leading portion of said second section abutting said trailing portion of said first section, and a trailing portion of said second section abutting said closed end of said mold cavity at said end of said first one of said segments, said means for heating being operative to heat said injected fluid molding material of said second section and said trailing portion of said first section to cure said second section and adhere said trailing portion of said first section to said leading portion of said second section, and said means for expanding said mold segments being operative to expand said mold segments radially outward to open said mold and permit movement of said trailing portion of said first section and said second section of said elongated body circumferentially through said mold cavity.

2. The apparatus of claim 1 wherein said temperature moderating means for limiting the heating includes a cooling plate having cooling passages and being positioned at said closed end of said mold cavity.

3. The apparatus of claim 1 wherein said means for injecting said curable fluid molding material into said mold cavity includes a plurality of circumferentially spaced gates along at least one side of said mold cavity.

4. The apparatus of claim 3 wherein said means for injecting said curable fluid molding material into said mold includes runners in a cold runner block in communication with said gates and cooled nozzles communicating said fluid molding material from said runners to tapered sprues for said gates whereby said fluid molding material remaining in said cooled nozzle and in said runners is prevented from curing and the cured fluid molding material in said gates is removable after curing of said cured sections of said elongated body.

5. The apparatus of claim 1 wherein said open end of said mold cavity opens on a space between said first one of said segments and said second one of said segments for moving said elongated body away from said mold.

6. The apparatus of claim 5 including means for pulling said elongated body circumferentially out of said mold and out of said mold cavity.

7. The apparatus of claim 6 wherein said means for pulling said elongated body comprises a pair of spaced-apart rollers for gripping said body and drive means for rotating at least one of said rollers.

8. The apparatus of claim 6 including a guide roller mounted on said mold between said open end and said means for pulling said elongated body circumferentially out of said mold.

9. The apparatus of claim 6 including a container ring movable into engagement with said segments in a closed position of said mold and said container ring having a slot adjacent said space for moving said elongated body through said slot and away from said mold.

10. The apparatus of claim 1 wherein said means for expanding said segments includes control means for actuating the expansion of said mold segments at different times to strip said first section and said second section from said mold after curing.

11. The apparatus of claim 6 wherein said mold cavity is divided, into equal angular spaces circumferentially located in said mold, each of said segments except for said second one of said segments having a circumferential length to cover one of said angular spaces of said mold cavity and said second one of said segments having a reduced length to cover only a portion of one of said angular spaces in said mold cavity providing said space for moving said elongated body away from said mold.

12. The apparatus of claim 1 wherein said mold includes a generally cylindrical core and said means to support said elongated body includes supporting rollers mounted on said core at circumferentially spaced positions under said mold cavity to support said cured elongated body as it is shifted circumferentially in said mold cavity after opening of said mold and expansion of said segments.

13. Apparatus for injection molding a tread made of curable fluid molding material, said apparatus comprising a generally cylindrical segmental mold having a core and radially movable segments supported on an upper press member forming a mold cavity between said segments and said core, a container ring supported on a cold runner block, said cold runner block being located underneath said container ring and said container ring being engageable with radially outer surfaces of said radially movable segments, said cold runner block being supported on a lower press member, means for injecting a curable fluid molding material into said mold cavity, means for heating said injected fluid molding material to cure said fluid molding material in said mold cavity, means, for disengaging said container ring from said radially movable segments upon opening said mold and means for expanding said radially movable segments of said mold to permit removal of said ring tread from said core.

14. The apparatus of claim 13 wherein said means for injecting said curable fluid molding material into said mold includes runners in a cold runner block in communication with a plurality of circumferentially spaced gates along at least one side of said mold cavity and cooled nozzles communicating said fluid molding material from said runners to said gates whereby said fluid molding material remaining in said cooled nozzle and in said runners is prevented from curing, and the cured fluid molding material in said gates is removable after curing of said cured sections of said elongated body.

15. The apparatus of claim 13 including ejection means mounted on said mold and engageable with said tread on said core for ejecting said tread from said core.

16. The apparatus of claim 15 wherein said ejection means comprises ejecting pins slidably mounted in said upper press member for moving downwardly to push said tread off said core.

17. The apparatus of claim 16 including an unloader movable into position under said core upon opening of said mold for receiving said tread and being movable to a position outside said mold once said tread is received.

18. The apparatus of claim 13 wherein said segmental mold includes means for molding a continuous elongated body of curable fluid molding material comprising a closed end of said mold cavity, a temperature moderating means at said closed end of said mold cavity, an open end of said mold cavity spaced from said closed end a distance less than the length of said, elongated body, a space between at least two of said radially movable segments for pulling a portion of said elongated body out of said mold and further including means to support said cured elongated body so that it may be shifted circumferentially in said mold cavity after expansion of said segments.

19. The apparatus of claim 18 wherein said temperature moderating means for limiting the heating includes a cooling plate positioned at said closed end of said mold cavity.

* * * * *